(No Model.)
2 Sheets—Sheet 1.
A. S. COOPER.
APPARATUS FOR PURIFYING ASPHALT.
No. 507,885.  Patented Oct. 31, 1893.
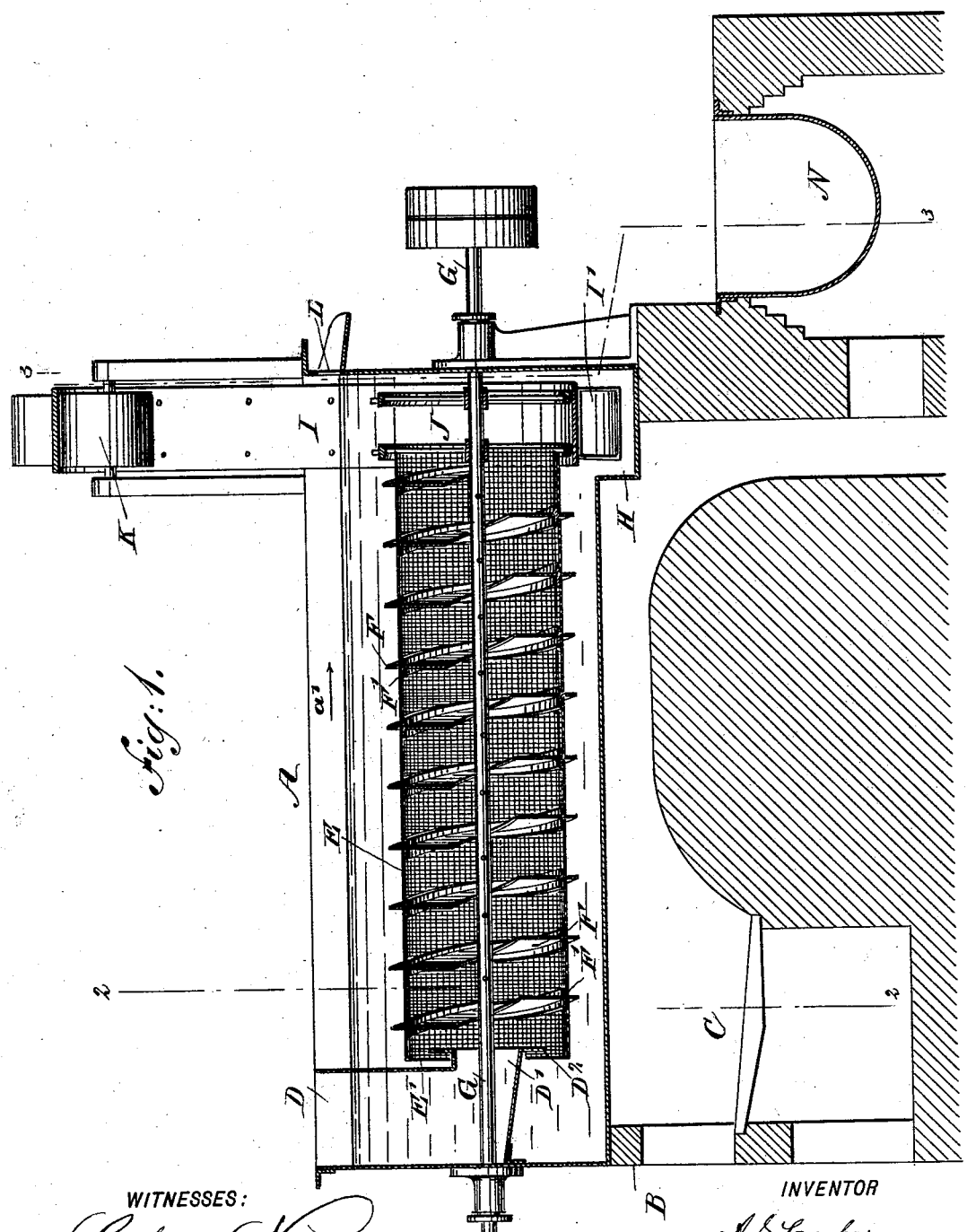

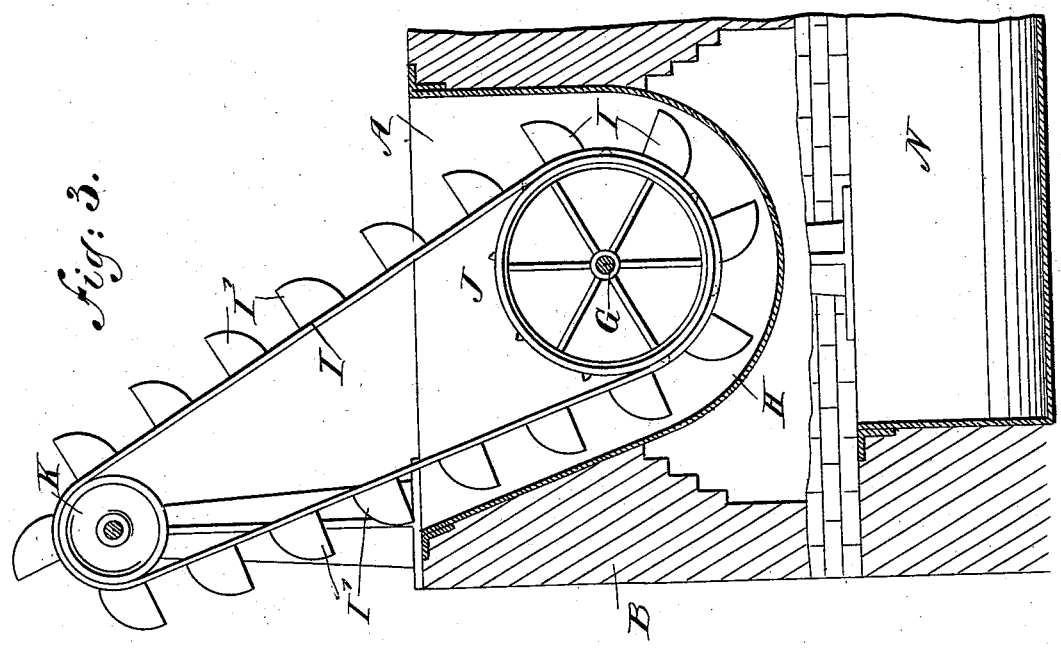
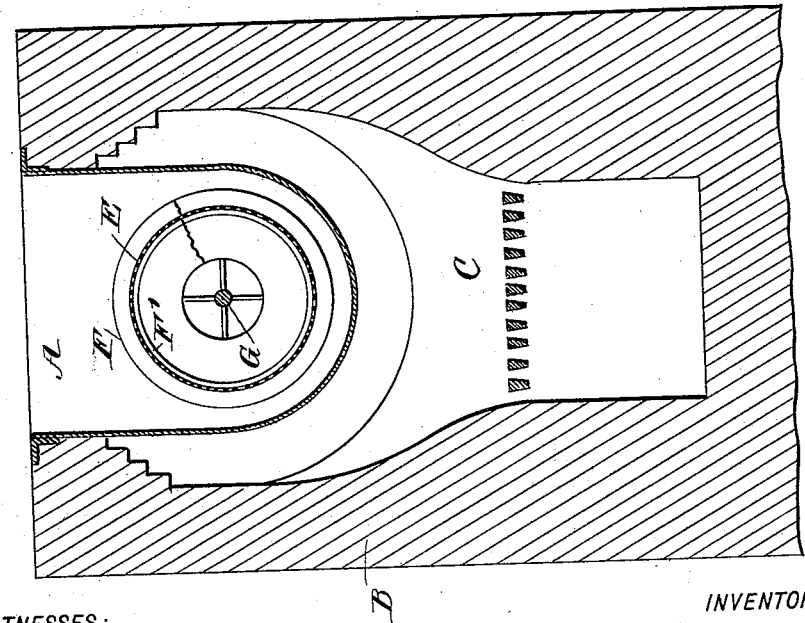

UNITED STATES PATENT OFFICE.

AUGUSTUS STEIGER COOPER, OF SANTA BARBARA, CALIFORNIA.

APPARATUS FOR PURIFYING ASPHALT.

SPECIFICATION forming part of Letters Patent No. 507,885, dated October 31, 1893.

Application filed July 7, 1893. Serial No. 479,818. (No model.)

*To all whom it may concern:*

Be it known that I, AUGUSTUS STEIGER COOPER, of Santa Barbara, in the county of Santa Barbara and State of California, have invented a new and Improved Apparatus for Purifying Asphalt, of which the following is a full, clear, and exact description.

The object of the invention is to provide a new and improved apparatus for purifying asphalt, which is simple and durable in construction, very effective in operation and arranged to readily and quickly separate the impurities from the bitumen.

The invention consists principally of a kettle provided with a feed hopper and a discharge spout or opening, a cylindrical screen held on a spiral blade and revolving in the said kettle, and an elevator into which discharges the said screen at the end opposite the feed hopper.

The invention also consists of certain parts and details, and combinations of the same, as will be hereinafter described and then pointed out in the claims.

Reference is to be had to the accompanying drawings, forming a part of this specification, in which similar letters of reference indicate corresponding parts in all the figures.

Figure 1 is a longitudinal sectional elevation of the improvement. Fig. 2 is a transverse section of the same on the line 2—2 of Fig. 1; and Fig. 3 is a similar view of the same on the line 3—3 of Fig. 1.

The improved apparatus is provided with a kettle A, open at the top and filled with water to the line indicated in Fig. 1. The kettle A is built in brickwork of a suitably constructed furnace B, provided at one end with the usual fire-box C, in which fuel is burned to heat the kettle, and the water contained therein.

At the end of the kettle A over the fire-box C is arranged a feed hopper D, into which the material to be treated is placed, the said hopper having its mouth D', discharge into one end of a cylindrical screen E, extending longitudinally within the kettle A and secured on flanges F' formed on a spiral blade F, extending partly within and partly outside of the cylindrical screen E, as plainly shown in the drawings. This spiral blade F is secured by spokes on a longitudinally-extending shaft G, journaled in suitable bearings at the ends of the kettle A, one outer end of the said shaft being provided with pulleys connected with suitable machinery for imparting a rotary motion to the said shaft G, to revolve the screen E and the spiral blade F within the kettle A.

The forward end of the screen E is provided with an inwardly-extending annular flange E', engaging the outside of an outwardly-extending annular flange $D^2$, formed on the inner end of the mouth D' of the feed hopper D. Thus, when the material to be treated is placed in the hopper D it is subjected to the heat of the water surrounding the said hopper and contained in the kettle A, whereby the asphalt is melted and flows through the mouth D' into the forward end of the revolving screen E to be moved longitudinally therein in the direction of the arrow $a'$ by the action of the spiral blade F. The other end of the revolving screen E discharges the sand and other impurities into an enlarged pit H, formed in this end of the kettle A.

The sand and other impurities are scooped up in the pit H by the buckets I' of an endless chain elevator I, of any approved construction, and passing at its lower end over a sprocket wheel J secured on the shaft G, the said elevator then extending upwardly out of the kettle and to one side thereof, as illustrated in Fig. 3, the lower end passing over a wheel K, so that the buckets discharge at the said wheel to one side of the kettle A. On the discharge end of the kettle A and directly above the water level, is arranged an outlet opening L, for the purified bitumen, the latter flowing down into a collecting vessel N, supported in a suitable brickwork at this end of the furnace—see Fig. 1.

The operation is as follows: The material to be purified is dumped into the hopper D in which it is liquefied through the heat of the water in the kettle A, to finally pass in this state into the revolving screen E as before described. The turning of the screen causes a continuous turning over and agitation of the material so that the latter is constantly agitated in the hot water, whereby the impurities and sand contained in the material readily separate, the impurities and sand being carried in the direction of the arrow $a'$ within the screen by the action of the spiral blade. The said impurities are finally discharged into the pit H to be carried outside of the kettle by the elevator I as before described. The bitumen rises through the perforations in the screen to the surface of the water and finally flows off through the outlet L into the vessel N in which it collects in a purified state and from which it is removed from time to time after it has become hard.

Having thus fully described my invention, I claim as new and desire to secure by Letters Patent—

1. An apparatus of the class described, for purifying asphalt, comprising a kettle containing water and adapted to be heated, and provided with an outlet, a feed hopper arranged in one end of the said kettle, a cylindrical screen arranged within the said kettle and revolving therein and into which discharges the said feed hopper, a spiral blade carrying the said screen and serving to move the impurities forward within the latter, and an elevator into which discharges the end of the screen opposite the feed hopper, to remove the impurities from the kettle, substantially as shown and described.

2. An apparatus of the class described, for purifying asphalt, provided with a kettle containing water, and adapted to be heated, and a feed hopper arranged in one end of the said kettle and adapted to receive the material to liquefy the same, substantially as shown and described.

3. An apparatus of the class described, for purifying asphalt, provided with a kettle containing water, and adapted to be heated, a feed hopper arranged in one end of the said kettle and adapted to receive the material to liquefy the same, and a revoluble separating screen into which the liquefied material is discharged to separate the bitumen from the impurities, substantially as shown and described.

4. An apparatus of the class described, comprising a kettle containing water and adapted to be heated, a revoluble cylindrical screen arranged in the said kettle, a spiral blade supporting the said screen, and an elevator into which discharges the said screen to carry off the sand and other impurities, substantially as shown and described.

5. An apparatus of the class described, provided with a kettle containing water and adapted to be heated, and a perforated screen revolving in the said kettle and carrying liquefied material, the said screen permitting the purified bitumen to rise through its meshes in the water while the sand and other impurities are carried along by the screen in the water, substantially as shown and described.

6. An apparatus of the class described, provided with a kettle containing water and adapted to be heated, and a perforated screen revolving in the said kettle and carrying liquefied material, the said screen permitting the purified bitumen to rise through its meshes in the water while the sand and other impurities are carried along by the screen in the water, the said kettle being provided with an outlet opening above the water level, substantially as shown and described.

AUGUSTUS STEIGER COOPER.

Witnesses:
JOHN DE LA CUESTA,
EDUARDO DE LA CUESTA.